(12) United States Patent
Fujiki et al.

(10) Patent No.: US 10,829,060 B2
(45) Date of Patent: Nov. 10, 2020

(54) VEHICLE BODY TRIM ASSEMBLY

(71) Applicant: Nissan North America, Inc., Franklin, TN (US)

(72) Inventors: Hiroyuki Fujiki, Kanagawa (JP);
Satoshi Sakurai, Kanagawa (JP);
Fumio Tejima, Kanagawa (JP); Bobby Fuentes, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 94 days.

(21) Appl. No.: 16/176,540

(22) Filed: Oct. 31, 2018

(65) Prior Publication Data

US 2020/0130610 A1 Apr. 30, 2020

(51) Int. Cl.
*B60R 13/04* (2006.01)
*B62D 25/08* (2006.01)

(52) U.S. Cl.
CPC ............ *B60R 13/04* (2013.01); *B62D 25/081* (2013.01)

(58) Field of Classification Search
CPC .............................. B60R 13/04; B62D 25/081

USPC ................................................. 296/192, 1.08
See application file for complete search history.

(56) References Cited

U.S. PATENT DOCUMENTS

| | | | | |
|---|---|---|---|---|
| 7,182,397 | B1 * | 2/2007 | Desai ................... | B62D 25/081 296/192 |
| 9,561,756 | B2 * | 2/2017 | Polovich ................. | B60R 13/04 |
| 2011/0148148 | A1 * | 6/2011 | Desai ................... | B62D 25/081 296/192 |
| 2013/0076073 | A1 * | 3/2013 | Tanaka ................. | B62D 25/081 296/192 |

* cited by examiner

*Primary Examiner* — Jason S Morrow
*Assistant Examiner* — E Turner Hicks
(74) *Attorney, Agent, or Firm* — Global IP Counselors, LLP

(57) ABSTRACT

A vehicle body trim assembly includes a trim member. The trim member includes a fender attachment structure, a windshield trim attachment structure and a cowl cover attachment structure. The trim member, including each of the fender attachment structure, the windshield trim attachment structure and the cowl cover attachment structure, is formed as a single, unitary, monolithic element molded from a rigid material and a section made of a flexible material.

15 Claims, 10 Drawing Sheets

VEHICLE BODY TRIM ASSEMBLY

BACKGROUND

Field of the Invention

The present invention generally relates to a vehicle body trim assembly. More specifically, the present invention relates to vehicle body trim assembly that includes a trim member fitted to a corner of a cowl area of the vehicle, attaches to a cowl cover that covers portions of the cowl area and is confined between an upper portion of a fender and a windshield of the vehicle.

Background Information

Vehicles include trim members that are decorative and that can also fulfill a functional need.

SUMMARY

One object of the disclosure is to provide a vehicle body structure with a trim member that directs water running off of the vehicle into a cowl area of the vehicle.

Another object of the disclosure is to provide a vehicle body structure with a trim member that attaches to a cowl cover that covers portions of a cowl area and is confined between an upper portion of a fender and a windshield of the vehicle.

In view of the state of the known technology, one aspect of the present disclosure is to provide a vehicle body trim assembly with a trim member. The trim member includes a fender attachment structure, a windshield trim attachment structure and a cowl cover attachment structure. The trim member, including each of the fender attachment structure, the windshield trim attachment structure and the cowl cover attachment structure, is formed as a single, unitary, monolithic element molded from a rigid material and a section made of a flexible material.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
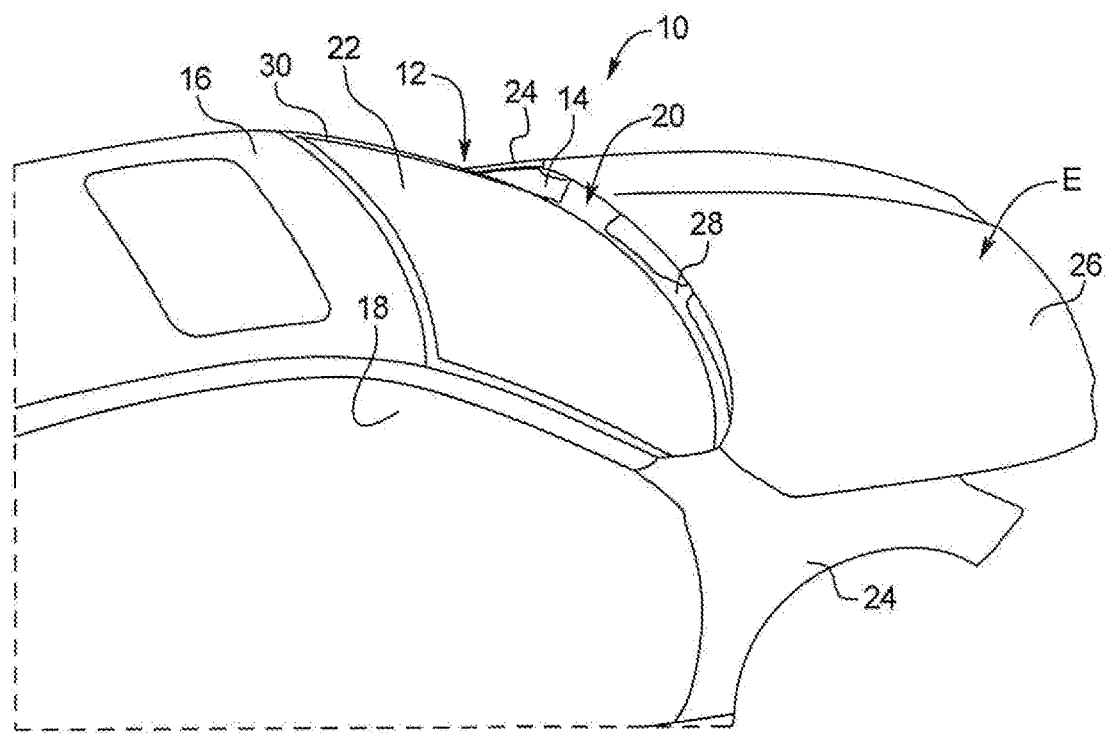
FIG. 1 is a perspective view of a vehicle body structure showing one trim member installed to one side of a cowl area adjacent to a lower end of a windshield, next to a fender and a cowl cover of the vehicle body structure in accordance with one exemplary embodiment.
Figure 2:
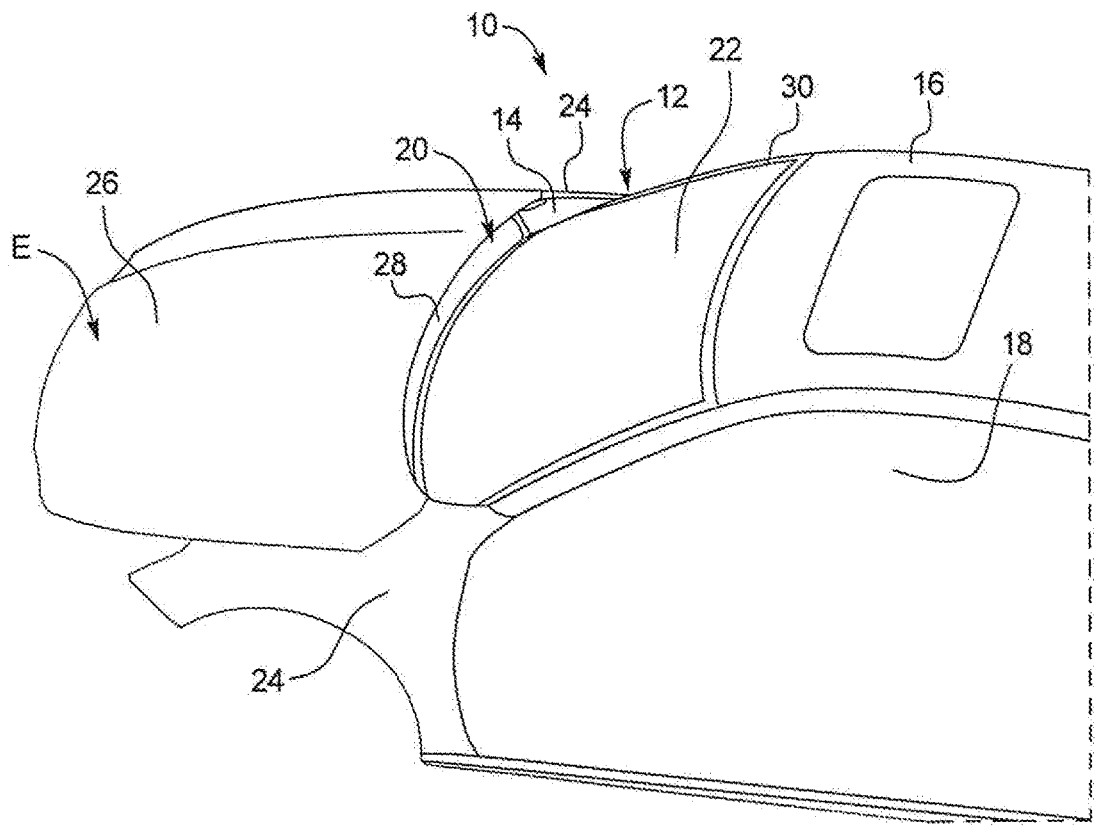
FIG. 2 is a perspective view of the vehicle body structure from an opposing angle showing another trim member that is identical to the trim member depicted in FIG. 1, but is a symmetrical mirror image of the trim member in FIG. 1, in accordance with one exemplary embodiment.
Figure 3:
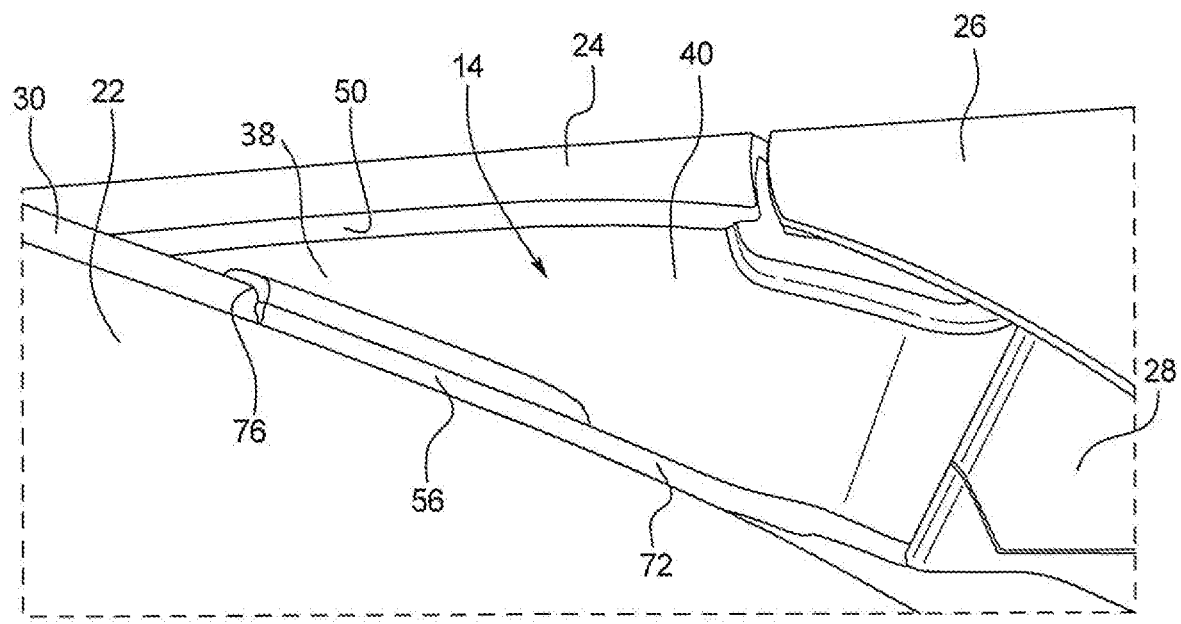
FIG. 3 is a perspective view of an inboard surface of the trim member depicted in FIG. 1 showing an upper edge of the trim member being installed to an upper inboard end of the fender such that a seal lip along a lower edge of the trim member presses against a lower portion of the windshield, in accordance with one exemplary embodiment.
Figure 4:
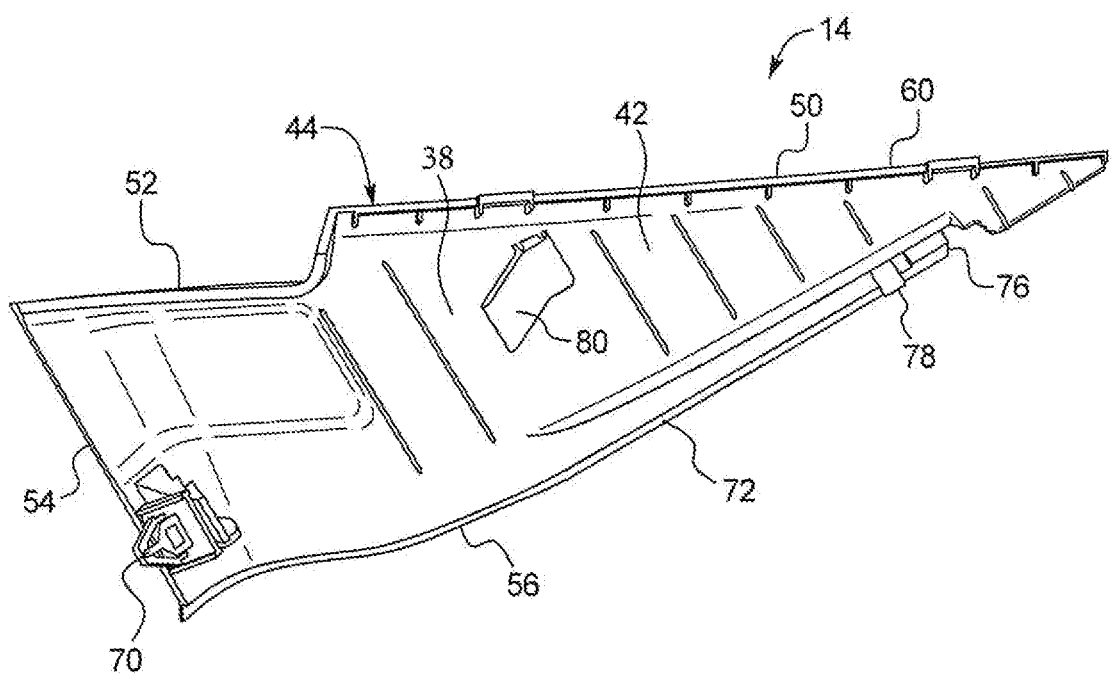
FIG. 4 is a perspective view of the trim member removed from the vehicle body structure showing an attachment surface opposite the inboard surface, the attachment surface having a snap-fitting projection and a projection extending therefrom in accordance with one exemplary embodiment.
Figure 5:
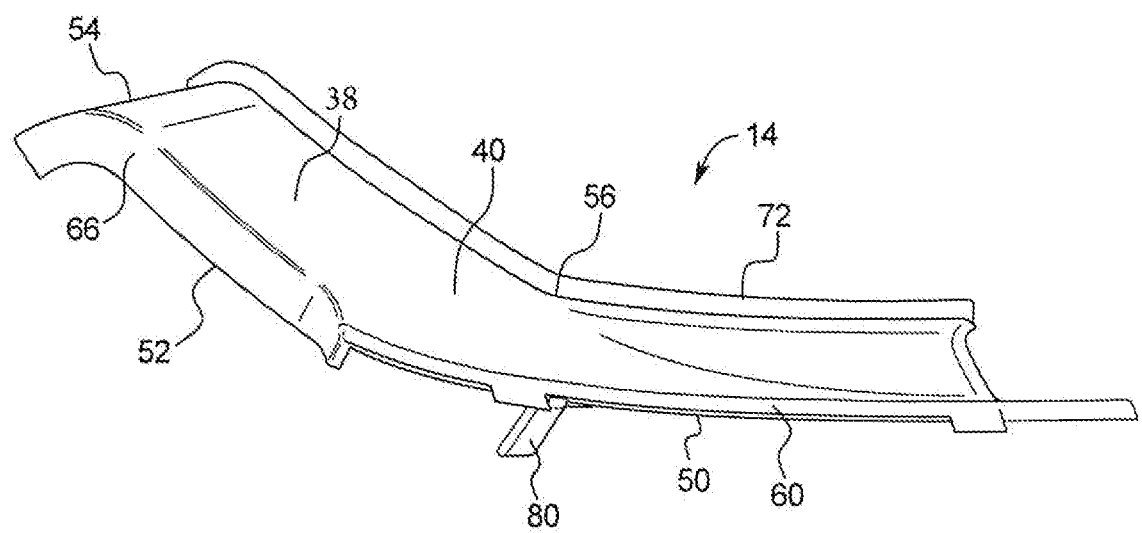
FIG. 5 is another perspective view of the trim member removed from the vehicle body structure showing the inboard surface and features defined along a peripheral edge of the trim member including a fender attachment structure and an upper ledge in accordance with one exemplary embodiment.
Figure 6:
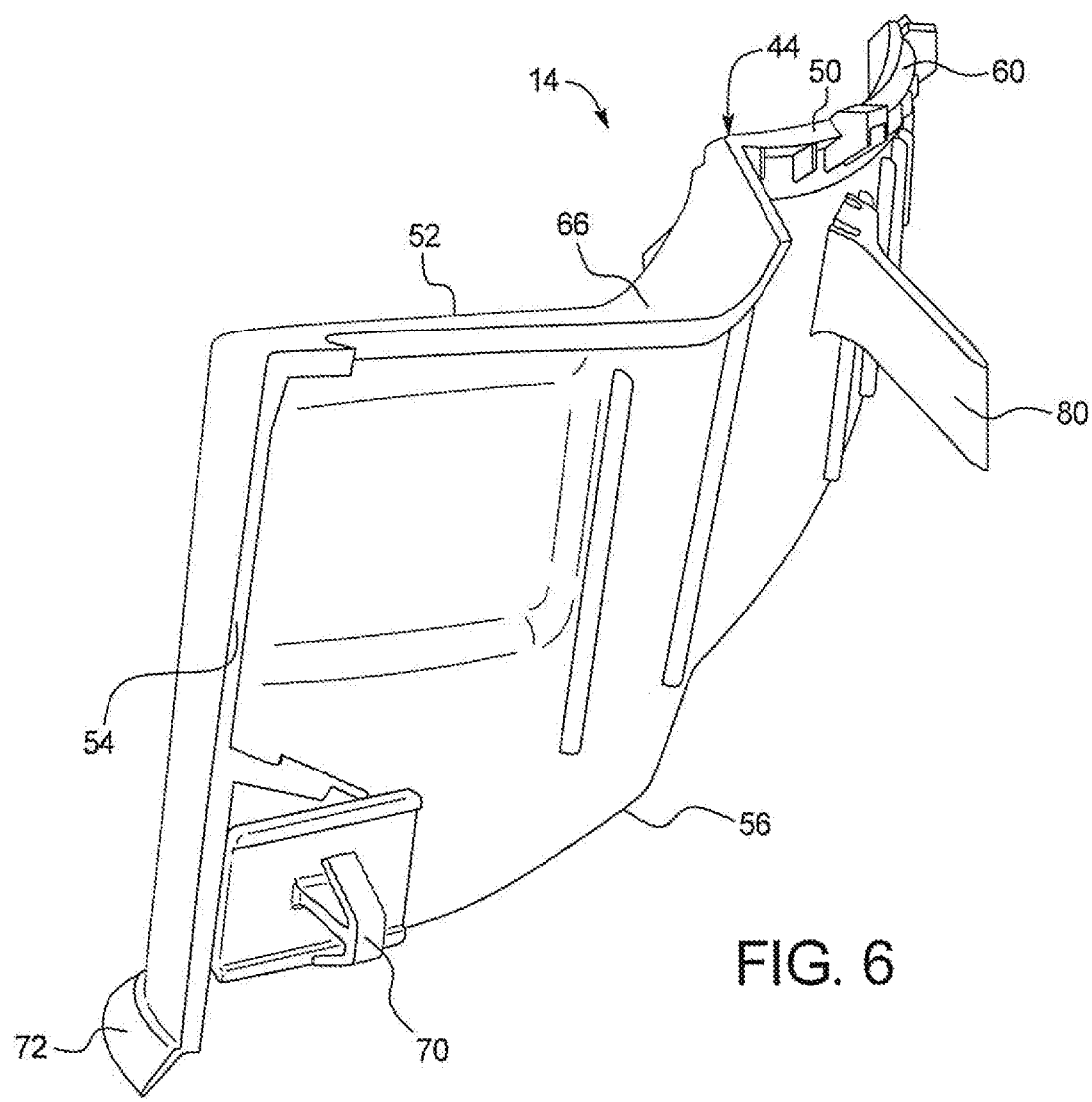
FIG. 6 is another perspective view of the trim member removed from the vehicle body structure showing a windshield contacting lip, the snap-fitting projection and the projection in accordance with one exemplary embodiment.
Figure 7:
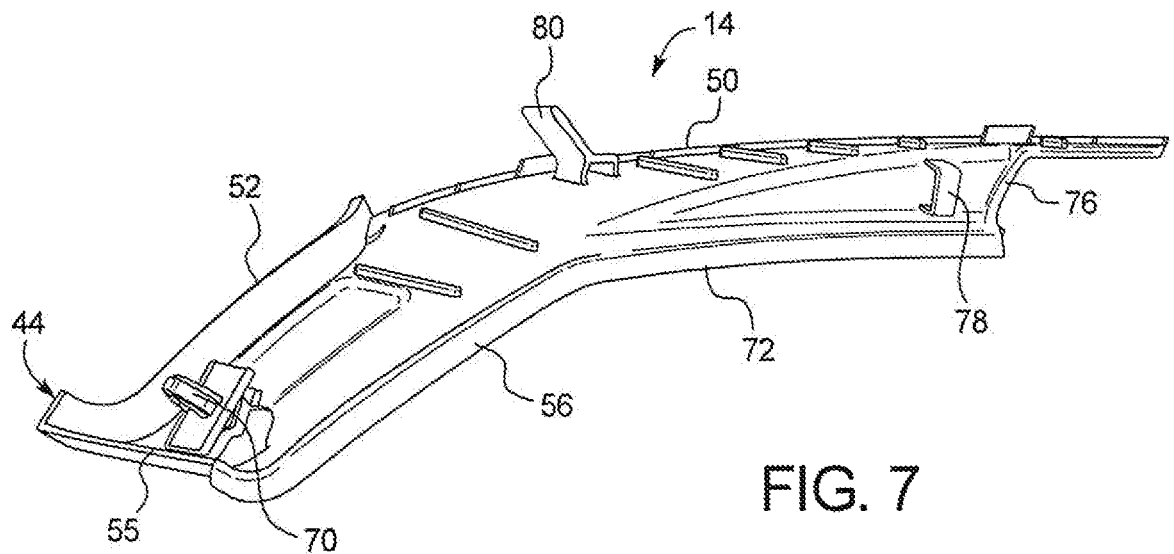
FIG. 7 is another perspective view of the trim member removed from the vehicle body structure showing a fender attachment structure, a windshield trim engaging sleeve, the snap-fitting projection and the projection, in accordance with one exemplary embodiment.
Figure 8:
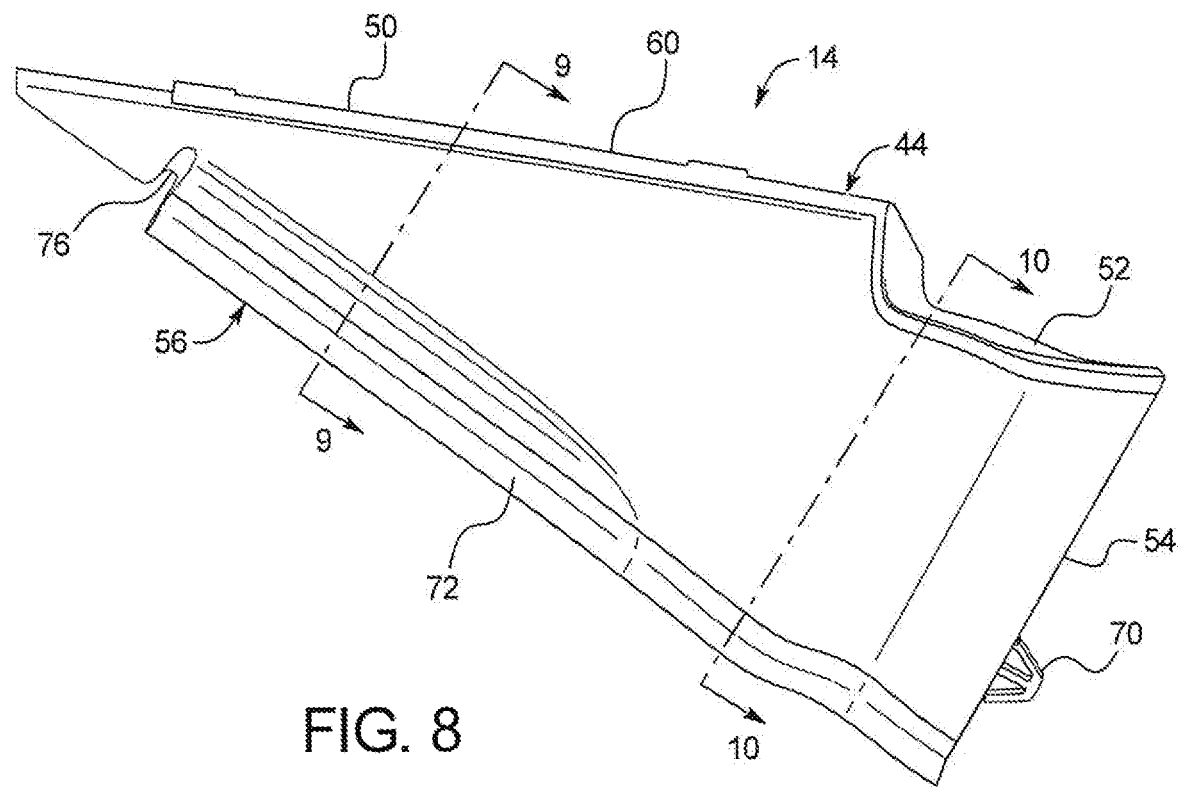
FIG. 8 is another perspective view of the inboard surface of the trim member removed from the vehicle body structure showing the windshield contacting lip and the fender attachment structure, in accordance with one exemplary embodiment.
Figure 9:
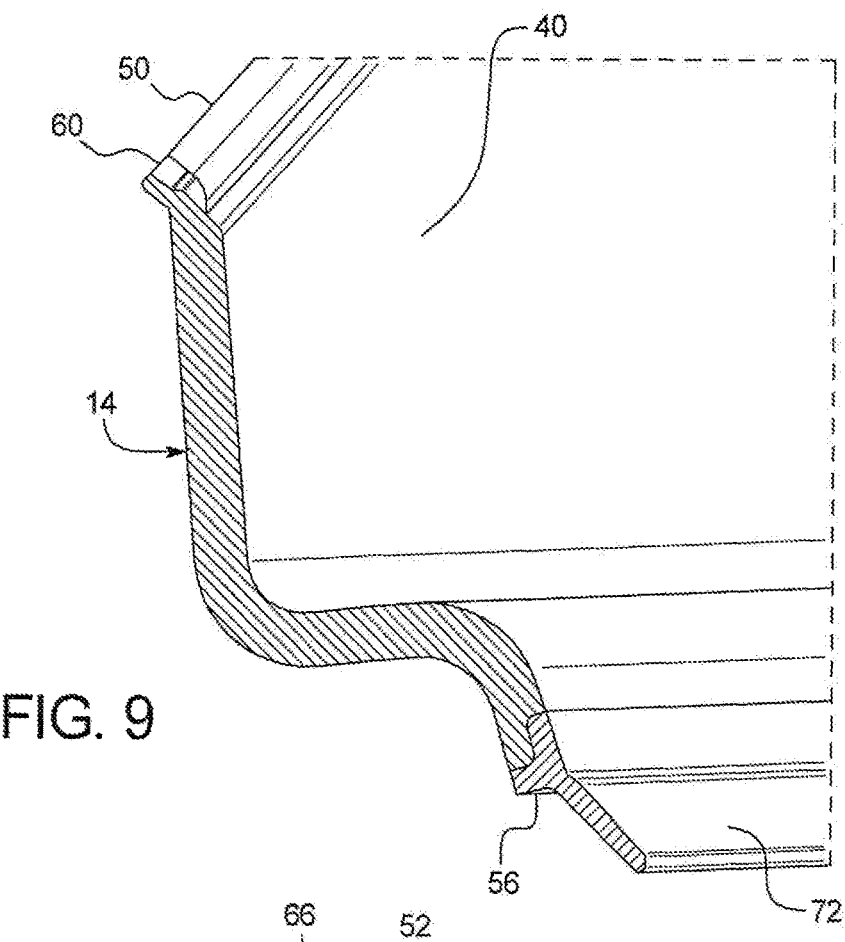
FIG. 9 is a cross-sectional view of the trim member taken along the line 9-9 in FIG. 8, in accordance with one exemplary embodiment.
Figure 10:
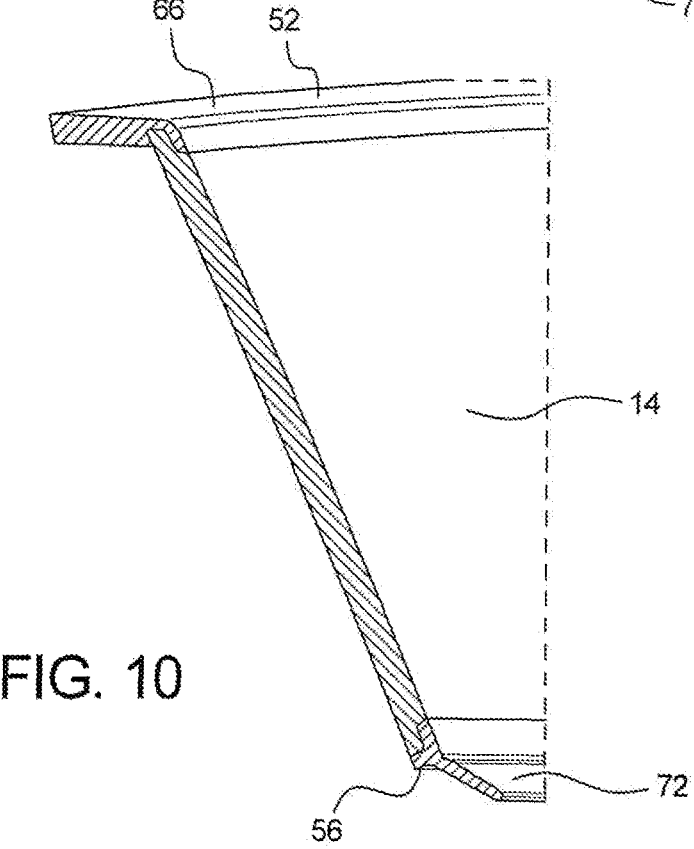
FIG. 10 is a cross-sectional view of the trim member taken along the line 10-10 in FIG. 8, in accordance with one exemplary embodiment.

Referring initially to FIGS. 1 and 2, a vehicle body structure 10 that includes a vehicle body trim assembly 12 that includes a trim member 14, is illustrated in accordance with a first embodiment.

The vehicle body structure 10 includes a unibody structure 16 that defines a passenger compartment 18. The unibody structure 16 also defines a cowl area 20 at the forward base of a windshield 22. A pair of front fenders 24 are attached to a front portion of the vehicle body structure 10 via, for example, mechanical fasteners (not shown) in a conventional manner. An engine compartment E is defined between the front fenders 24 with a hood 26 covering the engine compartment E. Since vehicle body structures are conventional structures well known in the art, further description of the vehicle body structure 10 is omitted, except where necessary, for the sake of brevity.

The cowl area 20 extends along a forward lower area of the windshield 22 and includes a removable cowl cover 28 that covers the cowl area 20, but, allows water to pass therethrough into the cowl area 20. The cowl area 20 includes water outlets (not shown) that allow water collected from the windshield 22 to drain to areas under the vehicle body structure 10 in a conventional manner. The cowl cover 28 is fixed to the vehicle body structure 10 by fasteners (not shown) that hold the cowl cover 28 in place over the cowl area 20 in a conventional manner.

The windshield 22 is installed within a windshield opening defined by the vehicle body structure 10 in a conventional manner. The windshield 22 includes a windshield trim member 30 that extends along the sides and top of the windshield 22. The windshield trim member 30 is typically attached to a seal that extends around the windshield 22, in a conventional manner.

Figure 12:
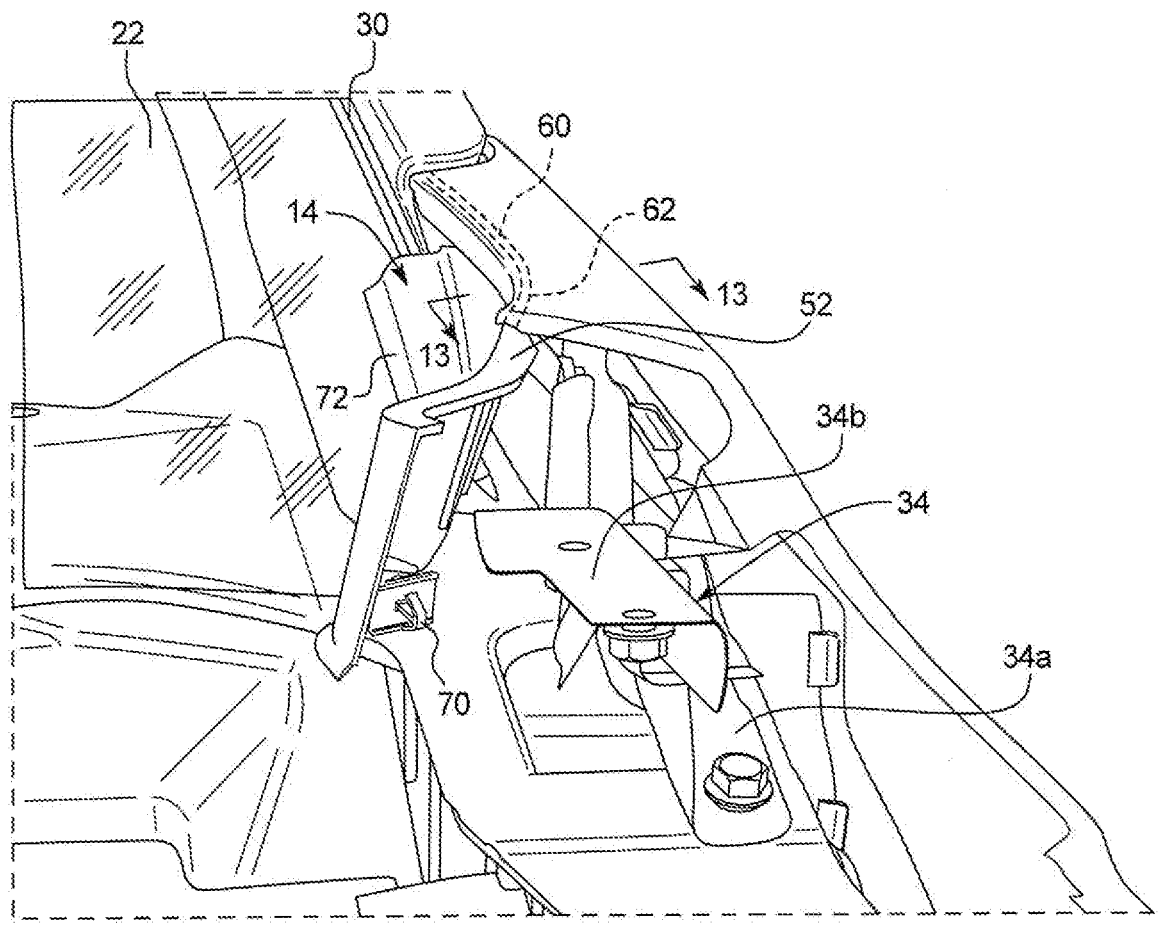
FIG. 12 is a perspective view of the vehicle body structure with the trim member installed and a hood of the vehicle body structure removed showing the hood hinge, the windshield contacting lip contacting the windshield and the inboard portion of the fender retaining the fender attachment structure of the trim member, in accordance with one exemplary embodiment.
Figure 13:
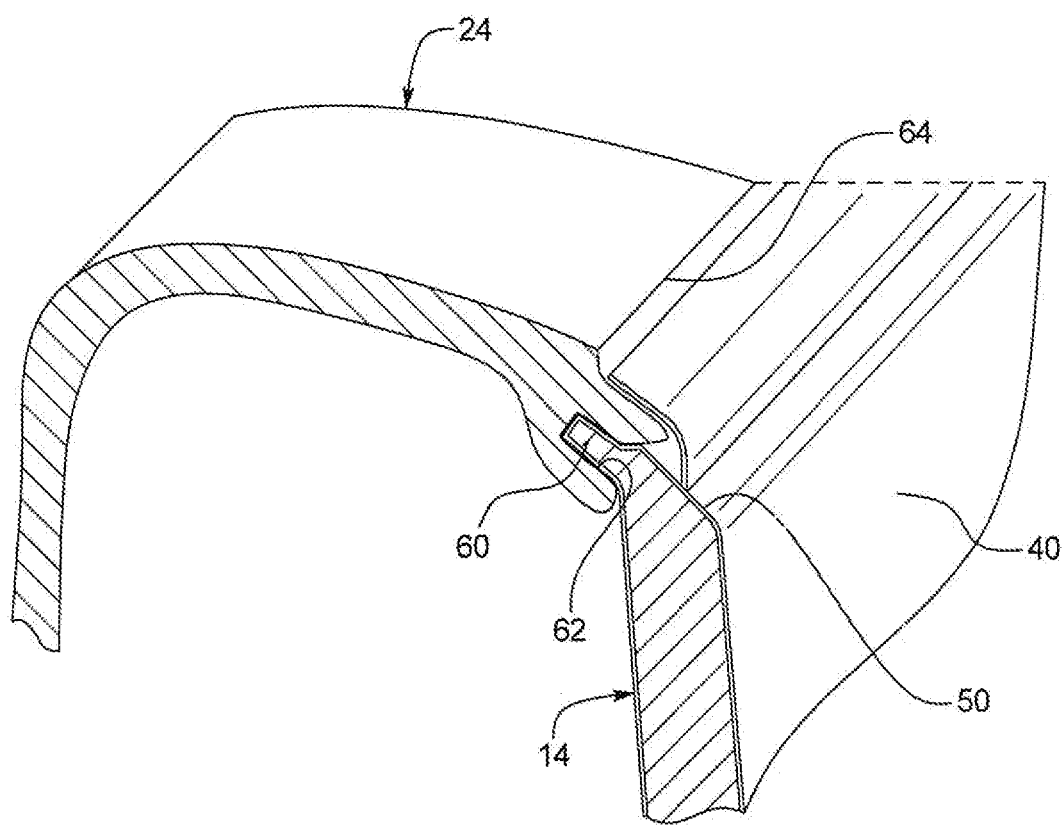
FIG. 13 is a perspective cross-sectional view taken along the line 13-13 in FIG. 12 showing the inboard portion of the fender retaining the fender attachment structure of the trim member, in accordance with one exemplary embodiment.

The hood 26 is movable between a closed orientation shown in FIGS. 1, 2 and 13, and an open orientation (not shown). The hood 26 is supported by hood hinges 34 (FIGS. 11-13, 15 and 16) that are described in greater detail below.

There are two trim members 14. The trim members 14 are identical and all of the features of one is also included on the other, except that they are symmetrical mirror images of one another. Specifically, a first of the trim members 14 is installed to the driver's side end of the cowl area 20 and a second of the trim members 14 is installed to the passenger's side end of the cowl area 20. Since the two trim members 14 include identical features (mirror images of one another) description of one of the trim members 14 applies equally to the other of the trim members 14. Therefore, only one of the trim members is described herein below for the sake of brevity.

As shown in FIGS. 3-8, the trim member 14 includes a main body 38 that has an inboard surface 40, an attachment surface 42 and an outer peripheral edge 44. The inboard surface 40 (referred to herein after as a trim surface 40). With the trim member 14 installed to the cowl area 20, the inboard surface 40 (the trim surface 40) faces the cowl area 20 and the windshield 22.

The outer peripheral edge 44 extends around the main body 38 of the trim member 14. The outer peripheral edge 44 is located and extends between the trim surface 40 and the attachment surface 42. The outer peripheral edge 44 has a first edge section 50, a second edge section 52 that extends from an end of the first edge section 50, a third edge section 54 that extends from an end of the second edge section 52, and a fourth edge section 56 that extends from an end of the third edge section 54 to another end of the first edge section 50.

Figure 14:
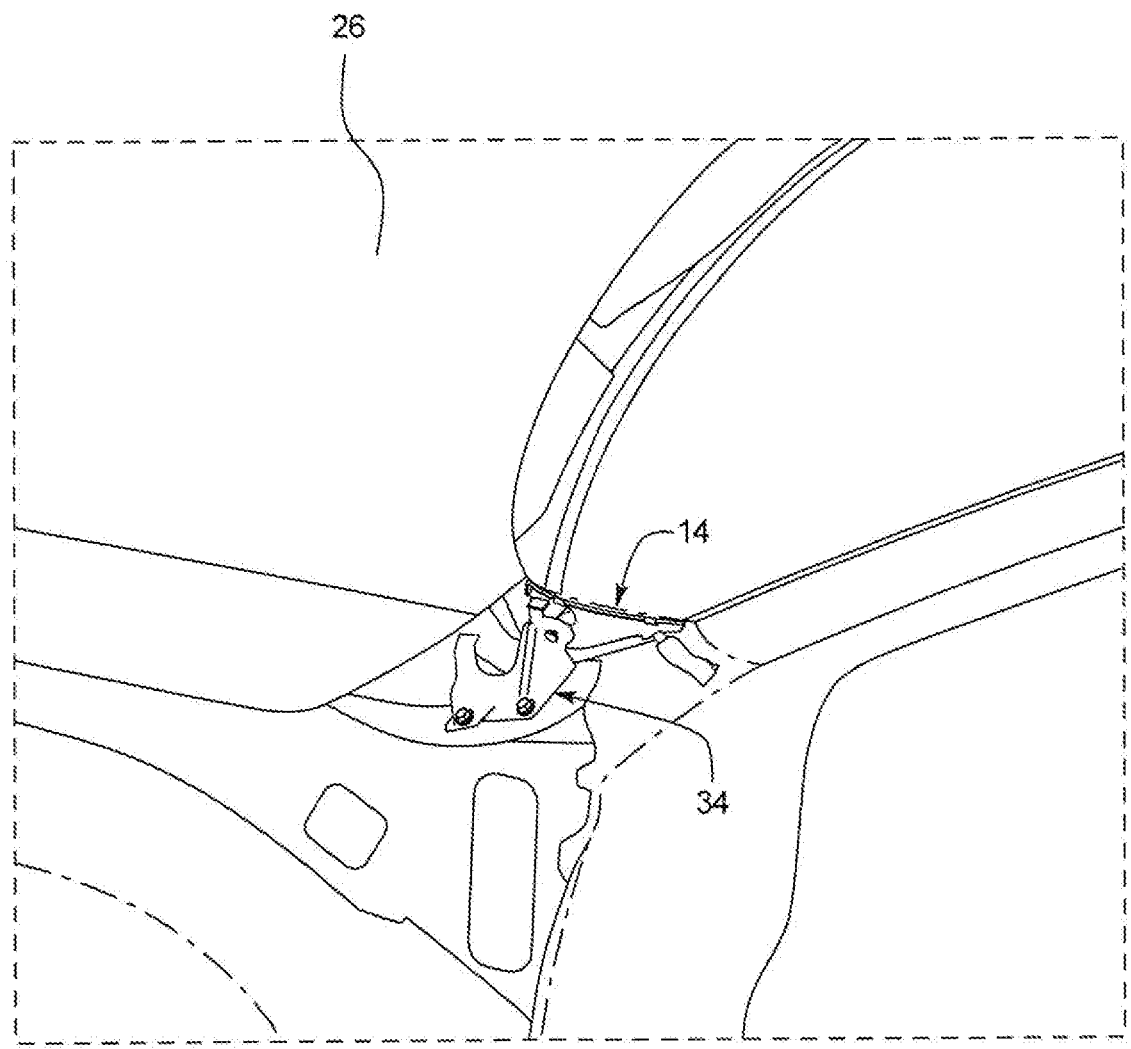
FIG. 14 is another perspective view of the vehicle body structure with the fender shown in phantom showing the hood hinge installed to the vehicle body structure and the hood, and, showing the trim member installed within the cowl area overlaying the windshield in accordance with one exemplary embodiment.

The first edge section 50 of the outer peripheral edge 44 defines a fender attachment structure 60 that is dimension and configured such that the fender attachment structure 60 fits into a corresponding elongated recess 62 formed along an inboard edge section 64 of the fender 24, as shown in FIG. 13. The second edge section 52 defines an upper ledge 66 dimensioned and located to mate with a portion of a hood 26 (a vehicle engine compartment hood) with the hood 26 in a closed position, as shown in FIG. 14. The third edge section 54 defines a cowl cover section configured to contact and mate with an outboard portion 28a of a vehicle cowl cover 28 with the trim member 14 installed to the vehicle 10, as shown in FIG. 15.

Figure 15:
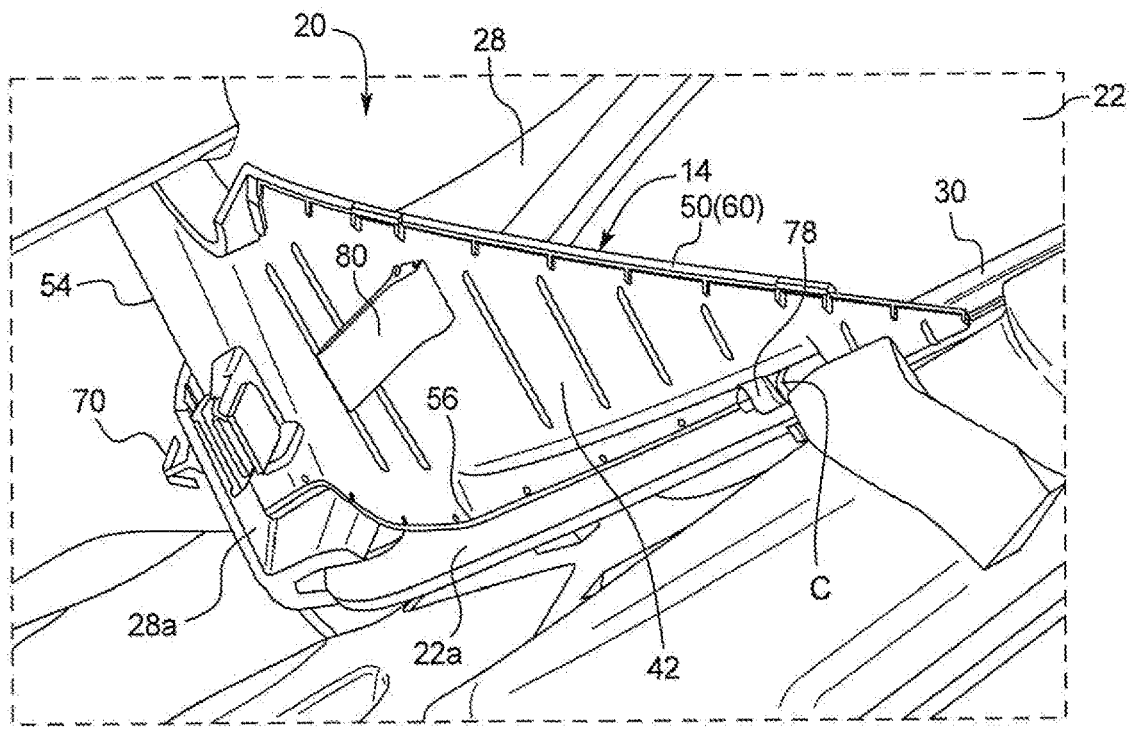
FIG. 15 is another perspective view of the vehicle body structure and the trim portion showing the snap-fitting projection installed to the cowl cover, with a portion of windshield trim extending through a gap along a lower edge of the trim member, in accordance with one exemplary embodiment.
Figure 16:
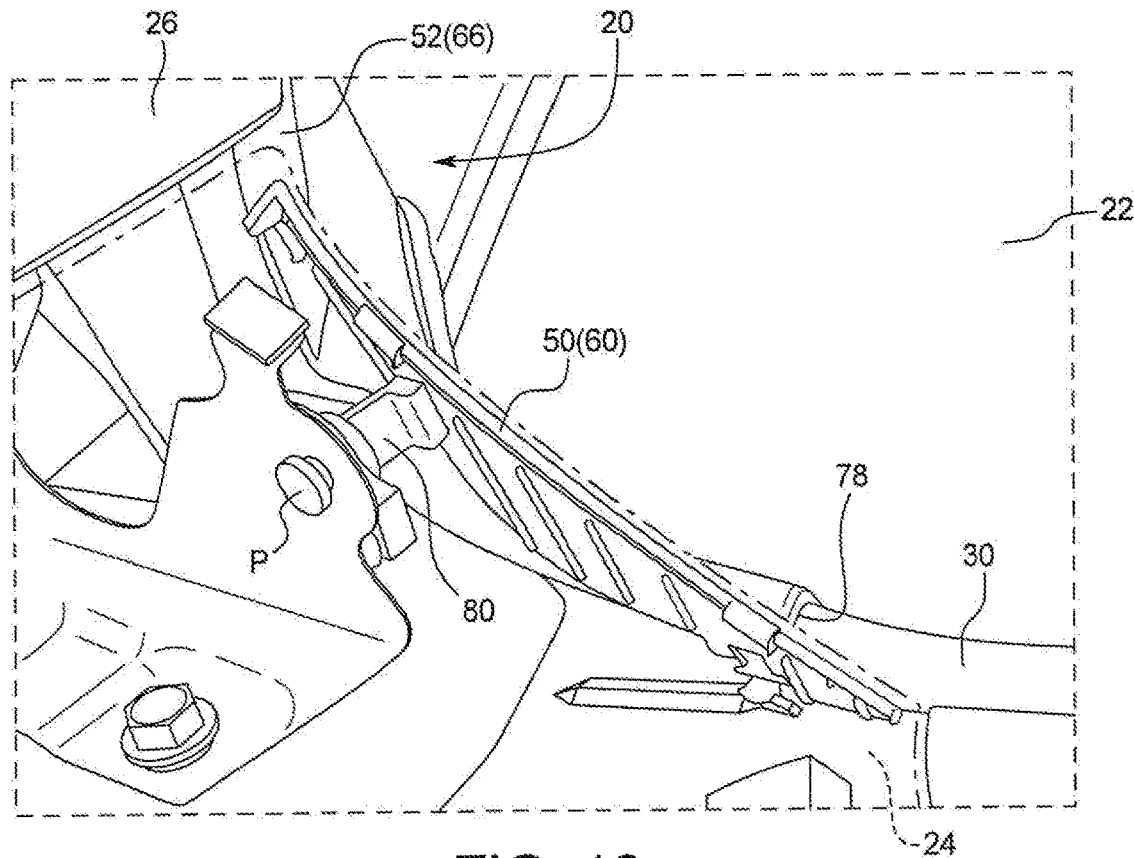
FIG. 16 is another perspective view of the vehicle body structure and trim member showing the portion of windshield trim extending through the gap along the lower edge of the trim member, and showing the projection contacting the pivot pin of the hood hinge in accordance with one exemplary embodiment.
Figure 17:
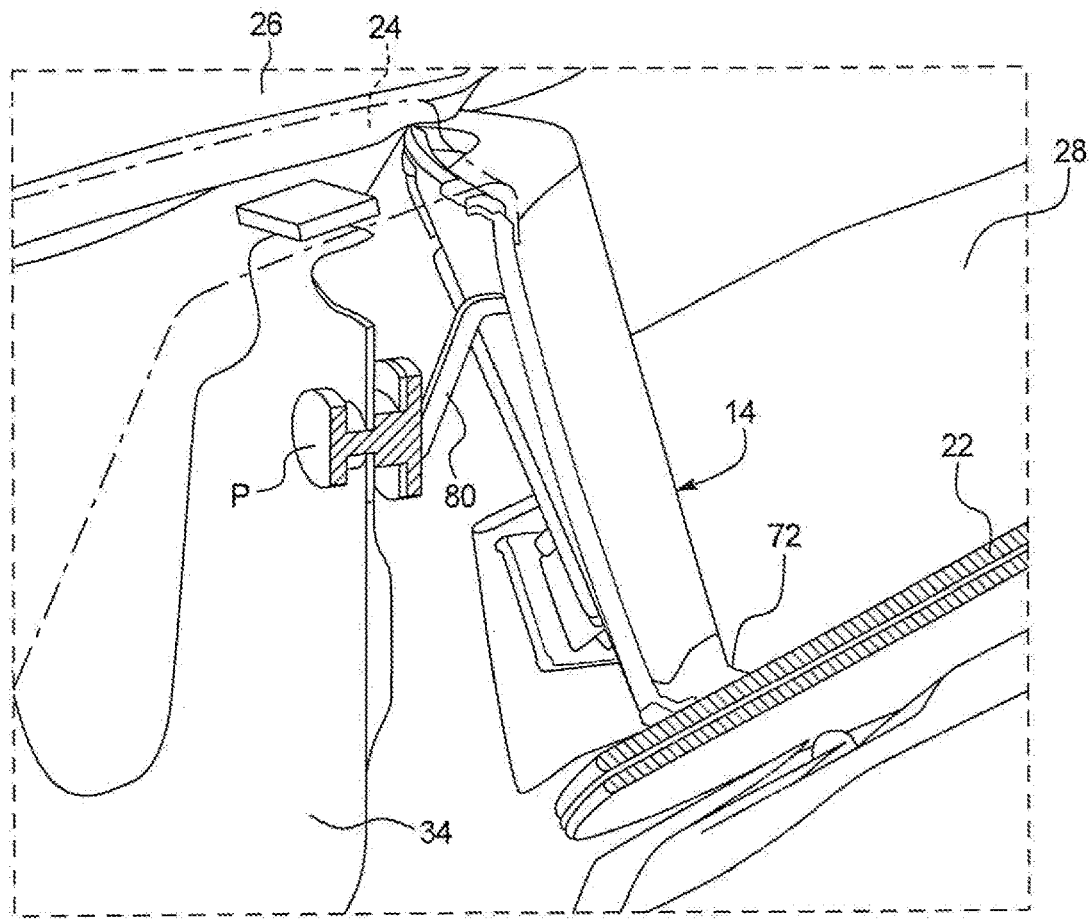
FIG. 17 is yet another perspective view of the vehicle body structure and trim member showing the projection contacting the pivot pin of the hood hinge, in accordance with one exemplary embodiment.

As shown in FIGS. 4, 6-7, 11-12 and 15, the attachment surface 40 (the outboard surface 40) includes a snap-fitting projection 70 dimensioned to attach to a structure or portion 28a of the vehicle cowl cover 28, as shown in FIG. 15. The snap-fitting projection 70 is fixed to a doghouse structure that is molded on the attachment surface 42 adjacent to an intersection of the third edge section 54 and the fourth edge section 56.

The attachment surface 42 includes a projection 80 extending therefrom. As describe further below, the projection 80 is oriented, dimensioned and positioned to contact a hood hinge pivot pin P with the trim member 14 installed to the vehicle body structure 10. The projection 80 is further configured to have resiliency such that the projection 80 flexes and presses against the pivot pin P.

As shown in FIGS. 3, 8-10 and 12, the fourth edge section 56 includes a windshield contacting lip 72 defined and/or formed along the fourth edge section 56 of the trim panel 14. As shown in FIG. 12, the windshield contacting lip 72 presses against a portion of the windshield 22, creating a seal therebetween.

Figure 18:
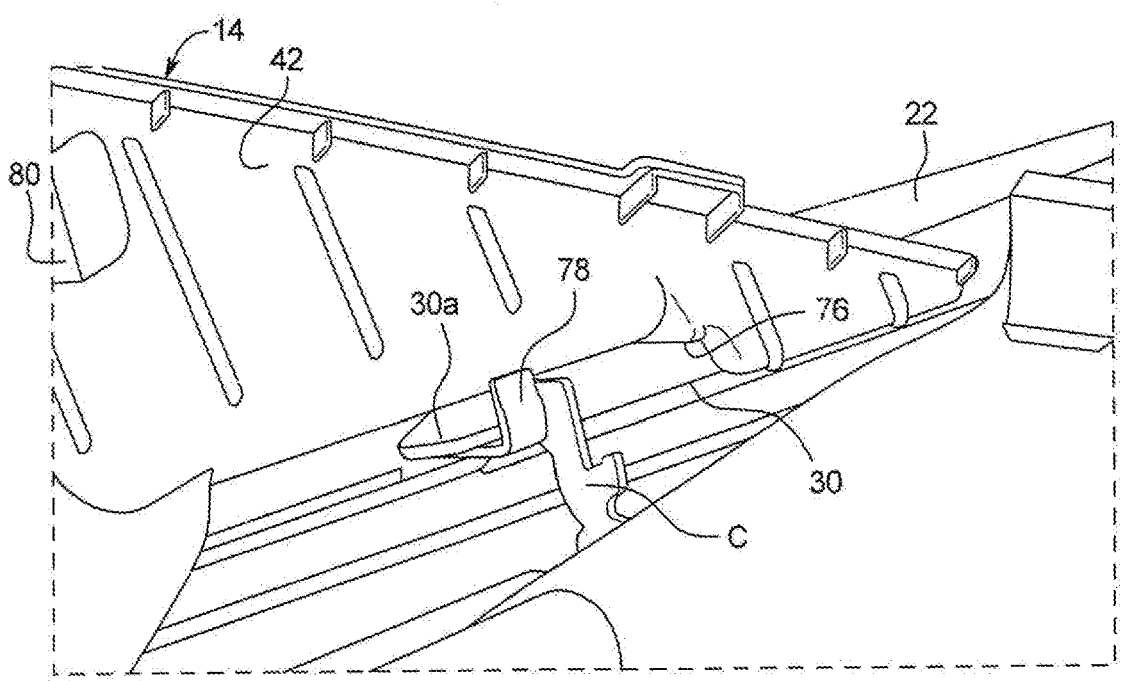
FIG. 18 is another perspective view of the vehicle body structure and trim member showing the portion of windshield trim extending through the gap along the lower edge of the trim member, in accordance with one exemplary embodiment.

As shown in FIGS. 3-4, 7-8, 15 and 18, the fourth edge section 56 includes a gap 76 and a sleeve 78. The gap 76 is dimensioned to receive a portion of the windshield trim member 30. The sleeve 78 is basically a loop that is dimensioned to receive the portion 30a of the windshield trim member 30, as shown in FIGS. 15 and 18. During installation of the trim member 14 to the cowl area 20, the sleeve 78 is slipped onto the portion 30a of the windshield trim member 30. Thereafter, the snap-fitting projection 70 is fitted to the portion 28a of the vehicle cowl cover 28. Finally, the fender 24 is installed such the fender attachment structure 60 fits into the elongated recess 62 along the inboard edge section 64. Optionally, as shown in FIG. 18, a clip C can be fitted to the windshield trim member 30 to further secure the trim member 13 in position.

Figure 11:
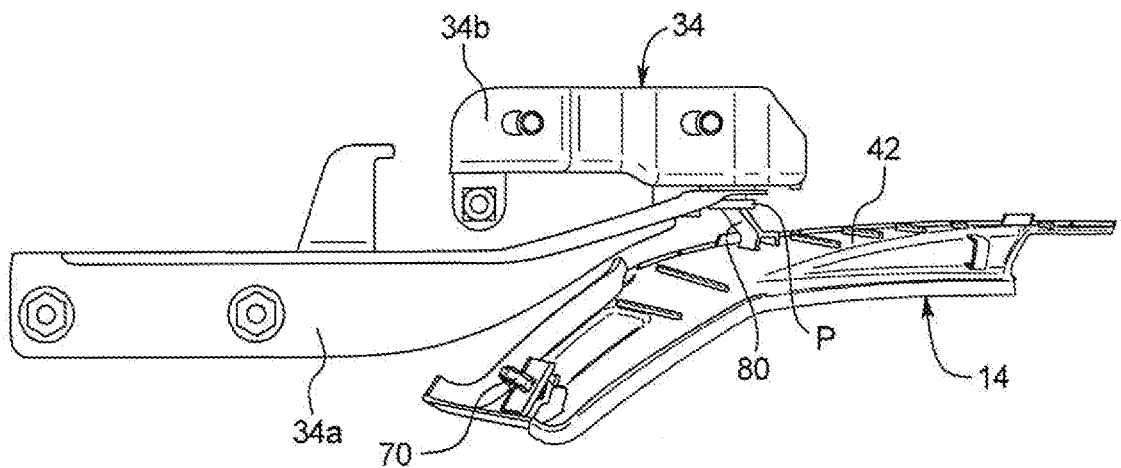
FIG. 11 is a bottom view (looking upward) of the trim member and a hood hinge showing the projection contacting a pivot pin of the hood hinge in accordance with one exemplary embodiment.

As shown in FIG. 11, the hinge includes a hood supporting bracket 34a and a body attachment bracket 34b. The pivot pin P connects the hood supporting bracket 34a to the body attachment bracket 34b such that with the hood 26 installed to the hood supporting bracket 34a secured to the hood 25, and the body attachment bracket 34b secured to the vehicle body structure 10, the hood 26 can be opened and closed as it pivots about the pivot pin P. The pivot pin P remains stationary during movement of the hood 26. Once the trim member 14 is installed, the projection 80 contacts the pivot pin P.

Hence, once installed, the trim member 14 is held in place by the snap-fitting projection 70 inserted into an opening of the portion 28a of the cowl cover 28; the fender attachment structure 60 (an elongated projection) being inserted into the elongated recess 62 of the fender 24; contact between the windshield contacting lip 72 and the windshield 22; engagement between the sleeve 78 at a lower portion of the trim panel 14 and the windshield trim member 30; and the projection 80 contacting the pivot pin P.

When the fender 24 is installed to the vehicle body structure 10, the fender attachment structure 60 is fitted into the recess 62 of the fender 24. Once the fender 24 is fixed in place, the fender 24 is dimensioned such that the trim member 14 is pushed in a downward direction such that the windshield contacting lip 72 is pressed against the windshield 22, and limits lateral movement of the upper edge of the trim member 14. As shown in FIG. 11, the snap fitting projection 70 extends in a direction that is approximately perpendicular to the pivot pin P of the hood hinge 34. The contact between the projection 80 and the pivot pin P of the hood hinge 34 limits lateral movement of the trim member 14.

Each of the above connections between the trim member 14 and other elements of the vehicle body structure 10 ensures that the trim member 14 remains in a desired orientation relative to the cowl area 20 and the windshield 22.

The trim member 14 formed as a single, unitary, monolithic element molded from two different materials. The main body 38, including the first, second and third edge sections 50, 52 and 54, are all made of a rigid material, such as a resin based polymer, plastic or other suitable moldable material. The windshield contacting lip 72 is formed from a flexible, resilient material. The windshield contacting lip 72 and the main body 38 of the trim member 14 are molded simultaneously. However, the snap-fitting projection 70 can be a separate element installed to a doghouse structure formed on the attachment surface 40 during the single molding process. In other words, the trim member 34, including the main body 38, the fender attachment structure 60 and the windshield trim attachment structure 78 (sleeve 78) are formed as a single, unitary, monolithic element.

The various elements of the vehicle body structure 10 other than the trim member 14 and the related features that contact and secure the trim panel 14, are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body trim assembly. Accordingly, these terms, as utilized to describe the present invention should be interpreted relative to a vehicle equipped with the vehicle body trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body trim assembly, comprising:
   a trim member having a fender attachment structure, a windshield trim attachment structure and a cowl cover attachment structure, the trim member, including each of the fender attachment structure,
   the trim member further including a main body with a trim surface, an attachment surface and an outer peripheral edge that extends around the trim member and is located between the trim surface and the attachment surface,
   the outer peripheral edge having a first edge section, a second edge section that extends from an end of the first edge section, a third edge section that extends from an end of the second edge section, and a fourth edge section that extends from an end of the third edge section to another end of the first edge section,
   the windshield trim attachment structure and the cowl cover attachment structure, being formed as a single, unitary, monolithic element molded from a rigid material and a section made of a flexible material, and
   the attachment surface includes a projection extending therefrom, the projection being oriented, dimensioned and positioned to contact a hood hinge pivot pin with the trim member installed to a vehicle.

2. The vehicle body trim assembly according to claim 1, wherein
   the first edge section of the outer peripheral edge defines the fender attachment structure such that the first edge section is dimensioned to fit into a corresponding elongated recess formed along an inboard edge section of a fender.

3. The vehicle body trim assembly according to claim 1, wherein
the second edge section defines an upper ledge dimensioned and located to mate with a portion of a vehicle engine compartment hood with the hood in a closed position.

4. The vehicle body trim assembly according to claim 1, wherein
the third edge section defines a cowl cover section configured to contact and mate with a portion of a vehicle cowl cover with the trim member installed to the vehicle.

5. The vehicle body trim assembly according to claim 4, wherein
the attachment surface includes a snap-fitting projection dimensioned to attach to a structure of the vehicle cowl cover, the snap-fitting projection being attached to the attachment surface adjacent to the intersection of the third edge section and the fourth edge section.

6. The vehicle body trim assembly according to claim 1, wherein
the fourth edge section includes a windshield contacting lip defined by the section of the trim member made of the flexible material.

7. The vehicle body trim assembly according to claim 6, wherein
a sleeve extends from a portion of the attachment surface adjacent to an intersection of the third and fourth edge sections such that a windshield trim extends through the sleeve with the trim member installed to the vehicle.

8. A vehicle body trim assembly, comprising:
a vehicle body structure having a front fender, a windshield, a windshield trim member, a cowl area extending along a forward lower area of the windshield, a cowl cover, a hood hinge and a hood moveably supported by the hinge,
a trim member having a fender attachment structure, a windshield trim attachment structure and a cowl cover attachment structure, such that the fender attachment structure is retained by a portion of the front fender, the windshield trim attachment structure is attached to a portion of the windshield trim member and the cowl cover attachment structure is attached to the cowl cover with a trim surface facing the cowl area, the trim member further including a main body defining the trim surface, an attachment surface and an outer peripheral edge that extends around the trim member and is located between the trim surface and the attachment surface, the outer peripheral edge having a first edge section, a second edge section that extends from an end of the first edge section, a third edge section that extends from an end of the second edge section, and a fourth edge section that extends from an end of the third edge section to another end of the first edge section, and
a sleeve extending from a portion of the attachment surface adjacent to an intersection of the third and fourth edge sections such that a windshield trim extends through the sleeve with the trim member installed to the vehicle.

9. The vehicle body trim assembly according to claim 8, wherein
the trim member, including each of the fender attachment structure, the windshield trim attachment structure and the cowl cover attachment structure, is formed as a single, unitary, monolithic element molded from a rigid material and a section made of a flexible material.

10. The vehicle body trim assembly according to claim 8, wherein
the first edge section of the outer peripheral edge defines the fender attachment structure such that the first edge section is dimensioned to fit into a corresponding elongated recess formed along an inboard edge section of a fender.

11. The vehicle body trim assembly according to claim 8, wherein
the second edge section defines an upper ledge dimensioned and located to mate with a portion of a vehicle engine compartment hood with the hood in a closed position, and the third edge section defines a cowl cover section configured to contact and mate with a portion of a vehicle cowl cover with the trim member installed to the vehicle.

12. The vehicle body trim assembly according to claim 8, wherein
the fourth edge section includes a windshield contacting lip defined by the section of the trim member made of the flexible material.

13. The vehicle body trim assembly according to claim 8, wherein
the attachment surface includes a snap-fitting projection dimensioned to attach to a structure of the vehicle cowl cover, the snap-fitting projection being attached to the attachment surface adjacent to the intersection of the third edge section and the fourth edge section.

14. The vehicle body trim assembly according to claim 8, wherein
the attachment surface includes a projection extending therefrom, the projection being oriented, dimensioned and positioned to contact a hood hinge pivot pin with the trim member installed to a vehicle.

15. A vehicle body trim assembly, comprising:
a vehicle body structure having a front fender, a windshield, a windshield trim member, a cowl area extending along a forward lower area of the windshield, a cowl cover, a hood hinge and a hood moveably supported by the hinge, and
a trim member having a fender attachment structure, a windshield trim attachment structure and a cowl cover attachment structure, the trim member, including each of the fender attachment structure, the windshield trim attachment structure and the cowl cover attachment structure, being formed as a single, unitary, monolithic element molded from a rigid material and a section made of a flexible material, such that the fender attachment structure is retained by a portion of the front fender, the windshield trim attachment structure is attached to a portion of the windshield trim member and the cowl cover attachment structure is attached to the cowl cover, the trim member includes a trim surface and an attachment surface opposite the trim surface, the trim surface facing the cowl area, the attachment surface facing a portion of the hood hinge, the attachment surface having a projection extending therefrom, the projection being oriented, dimensioned and positioned to contact a pivot pin of the hood hinge with the trim member installed to the vehicle body structure.

* * * * *